(12) United States Patent
Hosoda

(10) Patent No.: US 7,786,242 B2
(45) Date of Patent: Aug. 31, 2010

(54) RING-CONTAINING MODIFIED RESINS AND DISPERSANTS INCLUDING IT

(75) Inventor: Motoe Hosoda, Nara (JP)

(73) Assignee: Kyoeisha Chemical Co., Ltd., Osaka-Shi (JP)

( * ) Notice: Subject to any disclaimer, the term of this patent is extended or adjusted under 35 U.S.C. 154(b) by 1239 days.

(21) Appl. No.: 10/558,583

(22) PCT Filed: Jun. 4, 2004

(86) PCT No.: PCT/JP2004/008148

§ 371 (c)(1),
(2), (4) Date: Dec. 7, 2005

(87) PCT Pub. No.: WO2004/108788

PCT Pub. Date: Dec. 16, 2004

(65) Prior Publication Data

US 2007/0027289 A1     Feb. 1, 2007

(30) Foreign Application Priority Data

Jun. 9, 2003     (JP) ............................. 2003-164025

(51) Int. Cl.
C08G 18/42     (2006.01)
C08G 18/48     (2006.01)
C08G 18/62     (2006.01)
C08G 18/64     (2006.01)
C07C 271/06     (2006.01)

(52) U.S. Cl. ............................. 528/49; 528/74; 528/75; 528/76; 528/80; 528/83; 528/85; 560/24; 560/25; 560/26; 560/115; 560/157; 560/158

(58) Field of Classification Search .................. 528/74, 528/75, 85, 49, 76, 80, 83; 560/24, 25, 26, 560/115, 157, 158

See application file for complete search history.

(56) References Cited

U.S. PATENT DOCUMENTS

| 4,762,752 A | 8/1988 | Haubennestel et al. |
| 5,041,477 A * | 8/1991 | Hays ............................. 524/88 |
| 6,506,899 B1 * | 1/2003 | Simms ........................ 544/222 |

FOREIGN PATENT DOCUMENTS

| JP | A 60-166318 | 8/1985 |
| JP | A 02-008212 | 1/1990 |
| JP | A 03-114520 | 5/1991 |
| JP | 4-57869 A * | 2/1992 |
| JP | A 09-67562 | 3/1997 |
| JP | A 2000-506436 | 5/2000 |
| JP | A 2002-513669 | 5/2002 |
| JP | A 2002-322226 | 11/2002 |
| JP | A 2003-506538 | 2/2003 |
| WO | WO 97/26984 | 7/1997 |
| WO | WO 99/56864 | 11/1999 |
| WO | WO 01/10923 A1 | 2/2001 |

* cited by examiner

*Primary Examiner*—Rabon Sergent
(74) *Attorney, Agent, or Firm*—Oliff & Berridge, PLC

(57) ABSTRACT

The ring-containing modified resin is represented by the following chemical formula (1)

$$R^1[-(-O-CO-NH-R^2-NH-CO-O-R^3-)_p-O-R^4]_q \quad (1)$$

(in the chemical formula (1), $R^1$ is a dehydroxyl residue of a resin having a benzene ring and/or a condensed ring and hydroxyl group:

—$R^2$— is deisocyanate group derived from an organic diisocyanate:

—$R^3$— is a dehydroxyl residue of polyol having number-average molecular weight of 200 to 30000:

p is 1 to 3:

—$R^4$ is a hydrogen atom, alkyl group having 1 to 18 carbons, phenyl group:

q is the same number as the number of the dehydroxyl residue of $R^1$).

8 Claims, No Drawings

RING-CONTAINING MODIFIED RESINS AND DISPERSANTS INCLUDING IT

TECHNICAL FIELD

This invention relates to a modified resin for using as a dispersant for preparing paint and dispersion liquid which pigments or fine particles are dispersed homogeneously.

BACKGROUND ART

A nonaqueous paint comprises pigment, a resin for forming a coat, and an organic solvent. If the pigment is not dispersed homogeneously in the paint, the pigment aggregates and precipitates while storing the paint for a long time, and it causes a color separation, a color float or a lowering a gloss when painting. Therefore, a dispersant for dispersing the pigment homogeneously is added to the paint.

As such dispersant, (meth)acrylic type block copolymer which (meth)acrylic acid monomer containing amino group or (meth)acrylate containing ammonium group block-polymerizes with (meth)acrylate and macromonomer containing terminal (meth)acryloyl group, is mentioned in Japanese Patent Provisional Publication No. 2002-322226. The amino group or the ammonium group in the copolymer interacts with the pigment strongly, and makes the pigment disperse in the copolymer.

Generally, the dispersant has a pigment affinity part and a resin affinity part, and a basic group or an acidic group acts as the pigment affinity. However, when the dispersant including the basic group is used, the preservation stability of a silanol-including low-pollution type paint falls, or hardening of the baking paint using an acid catalyst is inhibited. On the other hand, when the dispersant including the acidic group with high acid value is used, viscosity of the paint increases, or the preservation stability of the paint falls. In other fields instead of the field of the paint such as an electronic material, addition of dispersant including the acidic group or the basic group tends to be avoided because the charge thereof affects the electronic material.

The present invention has been developed to solve the foregoing problems. It is an object of the present invention to provide a ring-containing modified resin having a benzene ring and/or a condensed ring which has no possibility of affecting stability or hardening of paint and a coating material, as a pigment affinity part. The ring-containing modified resin is used as a dispersant for dispersing the pigment and fine particles sufficiently homogeneously. It is another object of the present invention to provide a dispersant including it.

DISCLOSURE OF INVENTION

The ring-containing modified resin of the present invention developed for accomplishing the foregoing object, is represented by the following chemical formula (1)

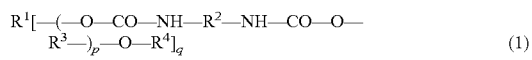

(in the chemical formula (1), $R^1$ is a dehydroxyl residue of a resin having a benzene ring and/or a condensed ring and hydroxyl group:

—$R^2$— is deisocyanate group derived from an organic diisocyanate:

—$R^3$— is a dehydroxyl residue of polyol having number-average molecular weight of 200 to 30000:

p is 1 to 3:

—$R^4$ is a hydrogen atom, alkyl group having 1 to 18 carbons, phenyl group:

q is the same number as the number of the dehydroxyl residue of $R^1$).

The resin having the benzene ring and/or the condensed ring and hydroxyl group is selected from the group consisting of a rosin derivative including hydroxyl group, a xylene resin including hydroxyl group, a styrene resin including hydroxyl group. Concretely, as the rosin derivative including hydroxyl group, PINECRYSTAL D-6011 having number-average molecular weight of 910, PINECRYSTAL D-6240 having number-average molecular weight of 3500, PINECRYSTAL D-6154 having number-average molecular weight of 1760, that are available from Arakawa Chemical Industries, Ltd., are mentioned. As the xylene resin including hydroxyl group, NIKANOL K-140 having a hydroxyl value of 290, NIKANOL K-100 having a hydroxyl value of 90, that are available from Mitsubishi Gas Chemical Company, Inc., are mentioned. As the styrene resin including hydroxyl group, MACROMONOMER HS-6 having number-average molecular weight of 6000 which is polystyrene including dihydroxyl group, MACROMONOMER HN-6 having number-average molecular weight of 6000 which is a copolymer of styrene including dihydroxyl group/acrylonitrile, that are available from Toagosei Co., Ltd., are mentioned.

The part of the benzene ring and/or the condensed ring in the ring-containing modified resin acts as the pigment affinity part of the dispersant. In the benzene ring and/or the condensed ring, pi-electron exists at delocalization state, so this conjugated system leads to interaction to the pigment, and the pigment can be dispersed sufficiently.

The organic diisocyanate is selected from the group consisting of an aromatic diisocyanate, an aliphatic diisocyanate, an alicyclic diisocyanate. Concretely, as the aromatic diisocyanate, tolylenediisocyanate (TDI), 4,4'-diphenylmethanediisocyanate (MDI), 1,5-naphthalenediisocyanate, are mentioned. As the aliphatic diisocyanate, hexamethylenediisocyanate (HMDI) is mentioned. As the alicyclic diisocyanate, isophoronediisocyanate (IPDI), 1,3-bis(isocyanatemethyl)cyclohexane are mentioned. It is preferable that tolylenediisocyanate (TDI) is used.

The polyol is selected from the group consisting of polyether polyol, polyester polyol, an acrylic copolymer including hydroxyl group. Concretely, as the polyether polyol, polyethylene glycol, polypropylene glycol, poly(oxyethylene) poly(oxypropylene) alkyl ether, poly(butylene flycol) are mentioned. As the polyester polyol, epsilon-caprolacton polymer, poly(12-hydroxystearic acid) are mentioned.

The acrylic copolymer including hydroxyl group is prepared by copolymerizing acrylates using a polymerization adjustment agent including the hydroxyl group such as 2-mercaptoethanol, and the hydroxyl group is introduced to the terminal of the copolymer. Concretely, a compound which the hydroxyl group was introduced to the terminal of poly (lauryl methacrylate), is mentioned.

The polyol having the number-average molecular weight of 200 to 30000 is used. Especially, it is further preferable that the polyol having the number-average molecular weight of 1000 to 15000 is used. If the number-average molecular weight is less than 200, the dispersion speed and the dispersion stability of the pigment may fall. If the number-average molecular weight is more than 30000, the viscosity of the dispersant increases too much, so it is hard to deal with.

The ring-containing modified resin of the present invention is prepared by carrying out the addition reaction or the poly-addition reaction of the organic diisocyanate and the polyol to the resin having the benzene ring and/or the condensed ring and hydroxyl group.

The dispersant of the present invention comprises the ring-containing modified resin. For example, the dispersant is prepared by dissolving the ring-containing modified resin into the inactive solvent. For example, the dispersant is used as the dispersant for pigment for paint, the dispersant for fine particles for a coating material, the dispersant for fine particles for sintering.

It is preferable that the inactive solvent can dissolve the produced ring-containing modified resin and can mix with the paint or the ink. Concretely, an aliphatic solvent such as n-hexane; an aromatic solvent such as xylene, solvesso100, solvesso150; a ketone type solvent such as methyl isobutyl ketone; an ester type solvent such as ethyl acetate, butyl acetate; a cellosolve type solvent such as butyl cellosolve, ethyl cellosolve; a propylene glycol type solvent such as propylene glycol monomethyl ether; a cellosolve acetate type solvent such as ethylene glycol monoethyl ether acetate; a propylene glycol monoalkyl ether acetate type solvent such as propylene glycol monomethyl ether acetate; are mentioned. These solvents may be used solely or plurally by mixing.

MODE FOR CARRYING OUT THE INVENTION

Hereunder, an applying example that the ring-containing modified resin applying the present invention is prepared, is explained. And a comparative example that the modified resin not applying the present invention is prepared, is explained.

Applying Example 30 parts by weight of propylene glycol monomethyl ether and 3.48 parts by weight of TDI were added to a vessel equipping a reflux condenser, a thermometer, a stirrer and a dropping tank, and the liquid temperature was maintained at 60 degrees centigrade. Mixture of 20 parts by weight of MPEG1000 which is methoxypolyethylene glycol having 1000 of molecular weight, that is available from Toho Chemical Industry Co., Ltd., and 30 parts by weight of propylene glycol monomethyl ether was dropped to the vessel while an hour. It was reacted for an hour at 60 degrees centigrade. Then Mixture of 11.9 parts by weight of NIKANOL K-100 which is the xylene resin including hydroxyl group, that is available from Mitsubishi Gas Chemical Company, Inc., and 15.7 parts by weight of propylene glycol monomethyl ether was dropped to the vessel while an hour. After dropping, it was reacted for two hours at 60 degrees centigrade to synthesize the modified xylene resin. The number-average molecular weight of prepared modified xylene resin was determined by gel permeation chromatography, and it was 24200. The acid value and the amine value of prepared modified xylene resin were measured, and both of them were 0.

Comparative Example 50 parts by weight of xylene was added to a vessel equipping a reflux condenser, a thermometer, a stirrer and a dropping tank, and the liquid temperature was maintained at 100 degrees centigrade. Mixture of 15 parts by weight of LIGHT ESTER DM which is dimethylamino ethyl methacrylate, that is available from Kyoeisha Chemical Co., Ltd., 30 parts by weight of ethyl acrylate, 15 parts by weight of MACROMONOMER AA-6 which is methyl methacrylate macromonomer having 6000 of weight-average molecular weight, that is available from Toagosei Co., Ltd., 0.5 parts by weight of dodecyl mercaptan and 1 part by weight of azobisisobutyronitrile was dropped to the xylene while three hours under a nitrogen gas atmosphere. After dropping, 0.5 parts by weight of azobisisobutyronitrile was further added. It was reacted for two hours at 100 degrees centigrade to synthesize the (meth)acrylic copolymer including amino group. The number-average molecular weight of prepared copolymer was determined by gel permeation chromatography, and it was 23000. The acid value and the amine value of prepared copolymer were measured, and the acid value was 0, the amine value was 19.

Examination Example 1

In order to investigate the physical properties of the main component of the paint using the modified xylene resins of Applying Example or Comparative Example, the paint was prepared, and the viscosity, the aggregation of the pigment, the gloss of coated film by measuring the gloss of 20 degrees and stability for a silanol-including resin, were measured.

(Preparing the Paint and Evaluation)

The main component of the paint was prepared using the modified xylene resins of Applying Example or Comparative Example. 1.35 g of the modified xylene resin of Applying Example or Comparative Example, 34 g of ACRYDIC A-801 which is toluene-butyl acetate solution of an acrylic polyol resin having hydroxyl value of 50 as 50% of non-volatile component, that is available from Dainippon Ink And Chemicals, Inc., 4.5 g of FW-200 as the carbon black that is available from Degussa, 19.0 g of thinner which the ratio of xylene to butyl acetate was 70 to 30 and 200 g of glass beads having the diameter of 1.5 to 2.0 mm were added to a 225 ml glass bottle. It was stirred with a paint shaker that is available from Red Devil Company for an hour. After an hour, 71.6 g of ACRYDIC A-801 was added, and the letdown thereof was executed. The glass beads were filtrated out to prepare the main component of the paint.

Furthermore, a silanol resin sample for evaluating the stability to the silanol-including resin was prepared using the main component of the paint. 60 parts by weight of xylene was added to a vessel equipping a reflux condenser, a thermometer, a stirrer and a dropping tank, and the liquid temperature was maintained at 100 degrees centigrade. Mixture of 20 parts by weight of gamma-methacryloxypropyltrimethoxysilane, 20 parts by weight of lauryl methacrylate, and 1 part by weight of azobisisobutyronitrile was dropped to the xylene while an hour under a nitrogen gas atmosphere. After dropping, 0.5 parts by weight of azobisisobutyronitrile was further added. It was reacted for two hours at 100 degrees centigrade to synthesize the (meth)acrylic copolymer including silanol group. 30 g of the prepared copolymer and 0.6 g of the above main component of the paint were added to a 140 ml glass bottle. It was stirred with a paint shaker that is available from Red Devil Company for 15 minutes to prepare the silanol resin sample.

The measurement of the viscosity was executed by following method. The rate of shear per 1 second, 10 seconds, 100 seconds and 1000 seconds were measured using a viscoelasticity measuring instrument of catalog No. Physica MCR 300 that is available from PHYSICA-Messtechnik GmbH, and the viscosity of the main component of the paint was evaluated.

The observation of the aggregation of the pigment was executed by following method. 10 g of the main component of the paint was added to a 50 ml screw tube having diameter of 35 mm and height of 78 mm. An inner wall of the tube was wetted with the main component of the paint sufficiently. After keeping the tube at stationary state for 24 hours, the inner wall of the tube was observed by visual observation, and the aggregation of the pigment was evaluated.

The measurement of the gloss of coated film was executed by following method. 100 parts by weight of the main component of the paint and 17.6 parts by weight of SUMIDUR N-75 that is available from Sumitomo Bayer Urethane Co., Ltd. as the hardener were mixed. The mixture was diluted with the thinner which the ratio of xylene to butyl acetate was 70 to 30, and the viscosity thereof by using a Ford cup No. 4 was adjusted to 12 seconds. The diluted paint was sprayed onto a tin-plate by air spray, and air-dried for 24 hours. After drying, the gloss of 20 degrees of the coated plate was measured using a glossmeter that is available from BYK-Gardner, and the gloss thereof was evaluated.

Stability for the silanol-including resin was evaluated by visual observing the change of the silanol resin sample which was kept at stationary state for a week at 50 degrees centigrade.

In addition, a blank examination was executed for comparison. As a blank, the main component of the paint was prepared by the similar procedure of Applying Example except for using no ring-containing resin, and the viscosity, the aggregation of the pigment, the gloss of coated film by measuring the gloss of 20 degrees and stability for silanol-including resin were measured.

The results are respectively shown in Table 1.

from Red Devil Company for an hour. After an hour, the glass beads were filtrated out to prepare the dispersion liquid of the fine particle titanium oxide.

The particle size of the fine particle is measured by a particle size distribution measuring instrument of catalog No. LB-500 that is available from Horiba, Ltd., and a median size thereof is calculated.

The result is shown in Table 2.

TABLE 2

|  | Median Size (micron) |
| --- | --- |
| Applying Example | 0.030 |
| Comparative Example | 0.090 |
| Blank | 4.500 |

As shown in Table 2, it is clear that the dispersion liquid using the modified xylene resin of the Applying Example has a small median size and excellent dispersibility, compared with the dispersion liquid using the modified xylene resin of the Comparative Example and the dispersion liquid using the blank resin.

Examination Example 3

In order to investigate dispersibility of sintering fine particles to the modified xylene resins of the Applying Example

TABLE 1

|  | Viscosity | | | | Aggregation | Gloss of | Stability for |
| --- | --- | --- | --- | --- | --- | --- | --- |
|  | $1\ s^{-1}$ | $10\ s^{-1}$ | $100\ s^{-1}$ | $1000\ s^{-1}$ | of Pigment | 20 deg. | Silanol resin |
| Applying Example | 270 | 266 | 260 | 230 | Nothing | 96.5 | No Change |
| Comparative Example | 840 | 790 | 400 | 250 | Nothing | 92.2 | Gelation |
| Blank | 56000 | 5240 | 777 | 254 | Aggregation | 85.7 | No Change |

As shown in Table 1, it is clear that the paint of Applying Example has lower viscosity, no aggregation of the pigment onto the inner wall of the bottle, the improved gloss of coated film, and excellent stability for silanol-including resin, compared with the paint of the Comparative Example and the paint of the blank resin.

Examination Example 2

In order to investigate dispersibility of the fine particles to the modified xylene resins of the Applying Example and the Comparative Example, dispersion liquid of the fine particles was prepared and a diameter of the fine particle was measured.

The dispersion liquid of the fine particles was prepared using the modified xylene resins of the Applying Example and the Comparative Example. First, 1.80 g of the modified xylene resin of Applying Example or Comparative Example, 24 g of methoxypropyl acetate, 6 g of fine particle titanium oxide of catalog No. STR-100A as the fine particle, which has 0.01 microns of primary particle size, that is available from Sakai Chemical Industry, Co., Ltd., and 30 g of glass beads having the diameter of 1.5 to 2.0 mm were added to a 140 ml glass bottle. It was stirred with a paint shaker that is available and the Comparative Example, dispersion liquid of the sintering fine particles was prepared and the viscosity thereof was measured.

As the sintering fine particles, Ni—Zn—Cu type ferrite powder was used. The modified xylene resin of the Applying Example or the Comparative Example was dissolved in 60 parts by weight of the water toward the 100 parts by weight of the ferrite powder. Media and the ferrite powder were added to the solution under stirring, and were dispersed. Then they were crushed with a ball mill, to obtain slurry. 13 parts by weight of acrylic emulsion at solid content toward 100 parts by weight of the ferrite powder was added to the slurry. It was stirred and mixed, and ceramic slurry was manufactured.

The dispersion state of the ceramic slurry was evaluated using a grindgauge. A board which had a trench that the depth of an end was 50 microns and that of the other end was 0 micron was prepared. When a paste on the board was scratched from a portion of the depth of 50 microns toward a portion of the depth of 0 micron horizontally, a length of a scratch was observed. It was evaluated by classifying following three standards: if the length was less than 2 microns, it was indicated by O, if the length was ranging from 2 microns to 5 microns, it was indicated by Δ, if the length is more than 5 microns, it was indicated by X.

The result is shown in Table 3.

TABLE 3

| | Value of Grindgauge |
|---|---|
| Applying Example | ○ |
| Comparative Example | Δ |
| Blank | X |

As shown in Table 3, it is clear that the dispersion liquid using the modified xylene resin of the Applying Example has a lower value of grindgauge and excellent dispersibility, compared with the dispersion liquid using the modified xylene resin of the Comparative Example and the dispersion liquid using the blank resin.

As explained in detail, the ring-containing modified resin of the present invention is an effective compound for dispersing the pigment and the fine particles homogeneously. The ring-containing modified resin has the benzene ring and/or the condensed ring, not carboxyl group or amino group, as the pigment affinity part, so it has no possibility of affecting the stability or the hardening of the paint and the coating material.

When the paint that the pigment is dispersed using the modified resin is applied, the coated film having the gloss and no uneven coloring will be obtained.

Moreover, in the dispersant that the fine particles for coating material or the fine particles for sintering are dispersed using the modified resin, these fine particles have a small particle size.

What is claimed is:

1. A ring-containing modified resin represented by:
   chemical formula (1)' of an adduct obtained by an addition reaction or multiple addition reactions of a resin compound, an organic diisocyanate, and an alcohol derived from a polyol selected from the group consisting of a polyether polyol, a polyester polyol, and an acrylic copolymer including hydroxyl groups; or
   chemical formulas (2)' or (3)' of an adduct obtained by an addition reaction or multiple addition reactions of a resin compound, an organic diisocyanate, and a polyol selected from the group consisting of a polyether polyol, a polyester polyol, and an acrylic copolymer including hydroxyl groups:

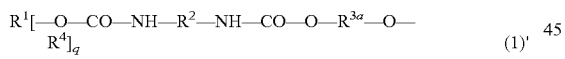

(1)' or

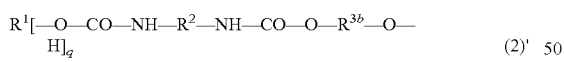

(2)' or

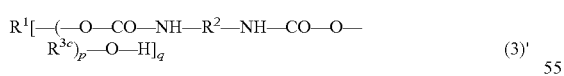

(3)' wherein:
   $R^1$ is a group derived from the resin compound represented by $R^1$—$(OH)_q$ as a xylene resin including a hydroxyl group;
   —$R^2$— is a group derived from the organic diisocyanate represented by OCN—$R^2$—NCO;
   —O—$R^{3a}$—O—$R^4$ of (1)' is a group derived from the compound represented by H—O—$R^{3a}$—O—$R^4$ in which —$R^4$ is an alkyl group having 1 to 18 carbons or a phenyl group, and —$R^{3a}$— is a group derived from the polyol having two hydroxyl groups and a number-average molecular weight of 200 to 30000;
   —O—$R^{3b}$—O—H of (2)' and —O—$R^{3c}$—O— of (3)' are a group derived from the compound represented by H—O—$R^{3b}$—O—H and H—O—$R^{3c}$—O—H, respectively, in which —$R^{3b}$—, and —$R^{3c}$— is a group derived from the polyol having two hydroxyl groups and a number-average molecular weight of 200 to 30000;
   q is the number of hydroxyl groups of the resin compound; and
   p is 2 to 3.

2. The ring-containing modified resin according to claim 1, wherein the organic diisocyanate is selected from the group consisting of an aromatic diisocyanate, an aliphatic diisocyanate, an alicyclic diisocyanate.

3. A dispersant of pigment in paint comprising a ring-containing modified resin represented by:
   chemical formula (1)' of an adduct obtained by an addition reaction or multiple addition reactions of a resin compound, an organic diisocyanate, and an alcohol derived from a polyol selected from the group consisting of a polyether polyol, a polyester polyol, and an acrylic copolymer including hydroxyl groups; or
   chemical formulas (2)' or (3)' of an adduct obtained by an addition reaction or multiple addition reactions of a resin compound, an organic diisocyanate, and a polyol selected from the group consisting of a polyether polyol, a polyester polyol, and an acrylic copolymer including hydroxyl groups:

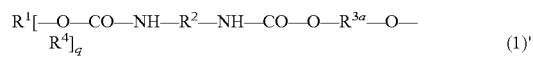

(1)' or

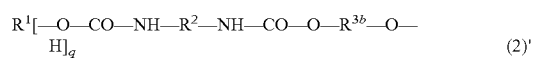

(2)' or

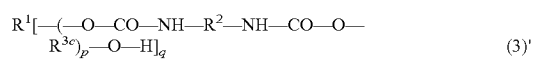

(3)' wherein:
   $R^1$ is a group derived from the resin compound represented by $R^1$—$(OH)_q$ as a xylene resin including a hydroxyl group;
   —$R^2$— is a group derived from the organic diisocyanate represented by OCN—$R^2$—NCO;
   —O—$R^{3a}$—O—$R^4$ of (1)' is a group derived from the alcohol represented by H—O—$R^{3a}$—O—$R^4$ in which —$R^4$ is an alkyl group having 1 to 18 carbons or a phenyl group, and —$R^{3a}$— is a group derived from the polyol having two hydroxyl groups and a number-average molecular weight of 200 to 30000;
   —O—$R^{3b}$—O—H of (2)' and —O—$R^{3c}$—O— of (3)' are a group derived from the alcohol represented by H—O—$R^{3b}$—O—H and H—O—$R^{3c}$—O—H respectively in which —$R^{3b}$—, and —$R^{3c}$— is a group derived from the polyol having two hydroxyl groups and a number-average molecular weight of 200 to 30000;
   q is the number of hydroxyl groups of the resin compound; and
   p is 2 to 3.

4. The dispersant of the pigment in the paint according to claim 3, wherein the organic diisocyanate is selected from the group consisting of an aromatic diisocyanate, an aliphatic diisocyanate, an alicyclic diisocyanate.

5. A dispersant of particles in a coating material comprising a ring-containing modified resin represented by:

chemical formula (1)' of an adduct obtained by an addition reaction or multiple addition reactions of a resin compound, an organic diisocyanate, and an alcohol derived from a polyol selected from the group consisting of a polyether polyol, a polyester polyol, and an acrylic copolymer including hydroxyl groups; or chemical formulas (2)' or (3)' of an adduct obtained by an addition reaction or multiple addition reactions of a resin compound, an organic diisocyanate, and a polyol selected from the group consisting of a polyether polyol, a polyester polyol, and an acrylic copolymer including hydroxyl groups:

$$R^1[-O-CO-NH-R^2-NH-CO-O-R^{3a}-O-R^4]_q \quad (1)'$$

or $$R^1[-O-CO-NH-R^2-NH-CO-O-R^{3b}-O-H]_q \quad (2)'$$

or $$R^1[-(-O-CO-NH-R^2-NH-CO-O-R^{3c})_p-O-H]_q \quad (3)'$$

wherein:
- $R^1$ is a group derived from the resin compound represented by $R^1-(OH)_q$ as a xylene resin including a hydroxyl group;
- $-R^2-$ is a group derived from the organic diisocyanate represented by $OCN-R^2-NCO$;
- $-O-R^{3a}-O-R^4$ of (1)' is a group derived from the alcohol represented by $H-O-R^{3a}-O-R^4$ in which $-R^4$ is an alkyl group having 1 to 18 carbons or a phenyl group, and $-R^{3a}-$ is a group derived from the polyol having two hydroxyl groups and a number-average molecular weight of 200 to 30000;
- $-O-R^{3b}-O-H$ of (2)' and $-O-R^{3c}-O-$ of (3)' are a group derived from the alcohol represented by $H-O-R^{3b}-O-H$ and $H-O-R^{3c}-O-H$ respectively in which $-R^{3b}-$, and $-R^{3c}-$ is a group derived from the polyol having two hydroxyl groups and a number-average molecular weight of 200 to 30000;
- q is the number of hydroxyl groups of the resin compound; and
- p is 2 to 3.

6. The dispersant of the particles in the coating material according to claim 5, wherein the organic diisocyanate is selected from the group consisting of an aromatic diisocyanate, an aliphatic diisocyanate, an alicyclic diisocyanate.

7. A dispersant of particles in sintering comprising a ring-containing modified resin represented by:

chemical formula (1)' of an adduct obtained by an addition reaction or multiple addition reactions of a resin compound, an organic diisocyanate, and an alcohol derived from a polyol selected from the group consisting of a polyether polyol, a polyester polyol, and an acrylic copolymer including hydroxyl groups; or chemical formulas (2)' or (3)' of an adduct obtained by an addition reaction or multiple addition reactions of a resin compound, an organic diisocyanate, and a polyol selected from the group consisting of a polyether polyol, a polyester polyol, and an acrylic copolymer including hydroxyl groups:

$$R^1[-O-CO-NH-R^2-NH-CO-O-R^{3a}-O-R^4]_q \quad (1)'$$

or $$R^1[-O-CO-NH-R^2-NH-CO-O-R^{3b}-O-H]_q \quad (2)'$$

or $$R^1[-(-O-CO-NH-R^2-NH-CO-O-R^{3c})_p-O-H]_q \quad (3)'$$

wherein:
- $R^1$ is a group derived from the resin compound represented by $R^1-(OH)_q$ as a xylene resin including a hydroxyl group;
- $-R^2-$ is a group derived from the organic diisocyanate represented by $OCN-R^2-NCO$;
- $-O-R^{3a}-O-R^4$ of (1)' is a group derived from the alcohol represented by $H-O-R^{3a}-O-R^4$ in which $-R^4$ is an alkyl group having 1 to 18 carbons or a phenyl group, and $-R^{3a}-$ is a group derived from the polyol having two hydroxyl groups and a number-average molecular weight of 200 to 30000;
- $-O-R^{3b}-O-H$ of (2)' and $-O-R^{3c}-O-$ of (3)' are a group derived from the alcohol represented by $H-O-R^{3b}-O-H$ and $H-O-R^{3c}-O-H$ respectively in which $-R^{3b}-$, and $-R^{3c}-$ is a group derived from the polyol having two hydroxyl groups and a number-average molecular weight of 200 to 30000;
- q is the number of hydroxyl groups of the resin compound; and
- p is 2 to 3.

8. The dispersant of the particles in the sintering according to claim 7, wherein the organic diisocyanate is selected from the group consisting of an aromatic diisocyanate, an aliphatic diisocyanate, an alicyclic diisocyanate.

* * * * *